United States Patent [19]

Lewis et al.

[11] Patent Number: 4,556,222
[45] Date of Patent: Dec. 3, 1985

[54] AUXILIARY SEALING SYSTEM FOR FLUID MIXERS

[76] Inventors: Donald E. Lewis, R.R. 2, Box 90, Letts, Iowa 52754; Delmar D. Lewis, R.R. 1, Box 14 B, Muscatine, Iowa 52761

[21] Appl. No.: 666,014

[22] Filed: Oct. 29, 1984

[51] Int. Cl.⁴ .............................................. F16J 15/06
[52] U.S. Cl. ......................................... 277/9; 277/64
[58] Field of Search ....................... 277/9, 9.5, 102, 64

[56] References Cited

U.S. PATENT DOCUMENTS

| | | | |
|---|---|---|---|
| 4,161,316 | 7/1979 | Nowack et al. | 277/9 |
| 4,383,768 | 5/1983 | Kupka | 277/9 |
| 4,521,040 | 6/1985 | Slyker et al. | 277/9.5 |

*Primary Examiner*—Robert I. Smith
*Attorney, Agent, or Firm*—Henderson & Sturm

[57] ABSTRACT

A typical fluid mixer of the heavy-duty type conventionally has a compartment including walls, one of which has a circular opening through which a motor-driven shaft extends. An external seal is provided for sealing the shaft-to-wall junction against fluid leakage. When it becomes necessary to replace the seal, the compartment must be drained to avoid leakage at the opening. The present invention provides an internal seal that is normally spaced along the shaft away from the wall but which can be forcibly moved toward and compressed against the wall and thus seal the shaft and opening and preventing leakage during repairs and consequently eliminating emptying the tank. The interior seal is supported by a movable carrier, and reversible force-exerting mechanism extending exteriorly of the compartment is employed to move the carrier and interior seal into and out of its interior sealing position. In a preferred embodiment, the force-exerting mechanism includes one or more jack screws.

8 Claims, 4 Drawing Figures

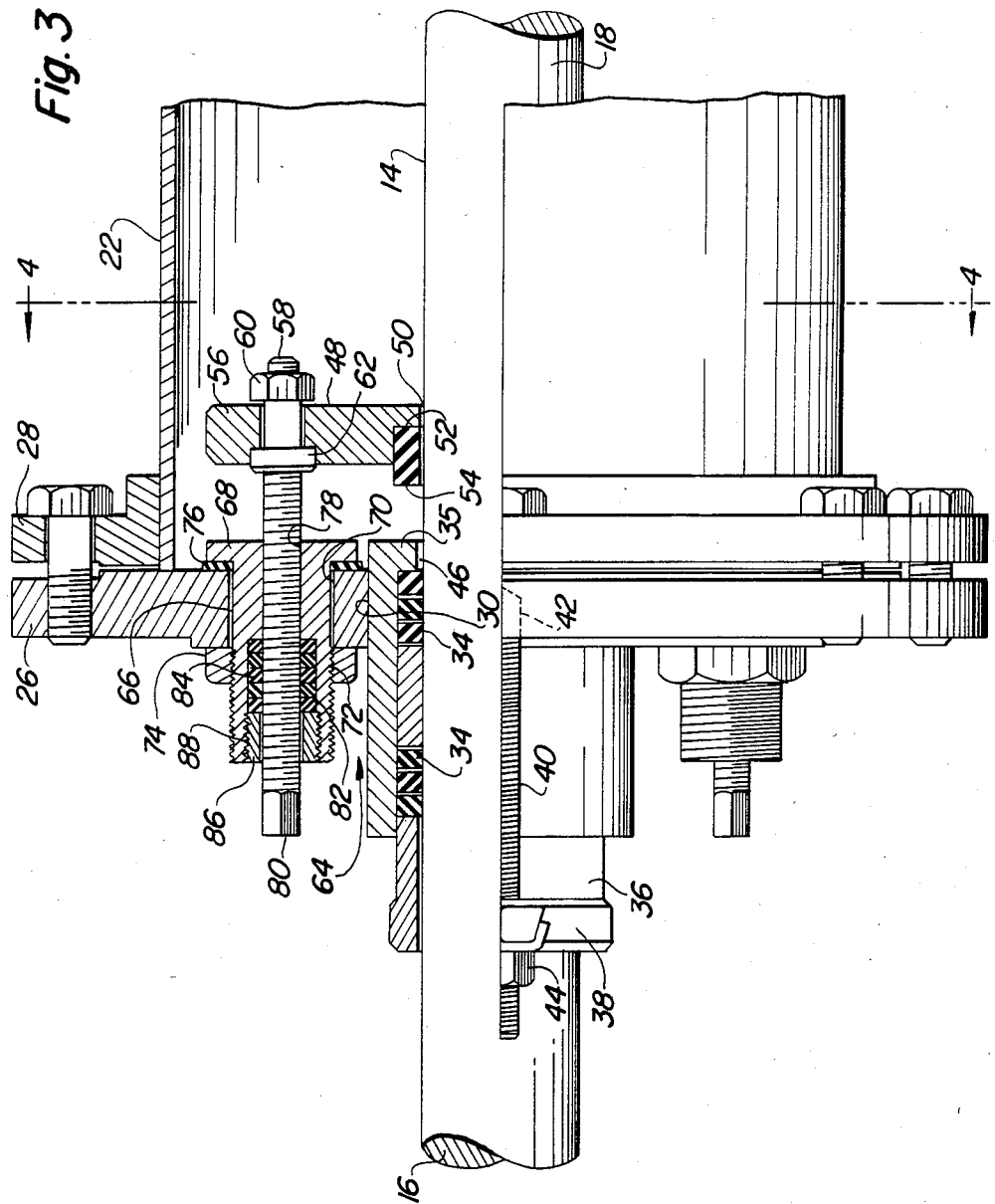

AUXILIARY SEALING SYSTEM FOR FLUID MIXERS

BACKGROUND AND SUMMARY OF THE INVENTION

In the art of heavy-duty fluid and like mixers, a tank or compartment having a plurality of walls houses a mixing rotor keyed to a motor-driven shaft which extends exteriorly of the compartment through a circular shaft-accommodating opening in one of the walls. The opening is conventionally sealed from the exterior face of the wall so as to prevent fluid leakage from the tank or compartment. The seal is of course subject to wear and deterioration and from time to time must be replaced. Obviously, when the seal wears, it leaks, and, when the seal is removed for replacement, the leakage becomes intolerable. Hence, it is common practice to drain the tank during seal replacement, a costly and time-consuming procedure.

According to the present invention, an auxiliary interior seal is provided for temporarily sealing the opening from within the tank during replacement of the outer seal. This seal concentrically encircles the shaft inside the compartment and is normally axially spaced inwardly from the wall so as to have no sealing function during regular operation of the machine. The seal is supported by a carrier which itself is mounted for axial movement along the shaft from a normal position maintaining the seal in spaced relation to the wall to a sealing position in which the seal is compressed against the wall to seal the shaft opening from the inside of the tank or compartment. Force-exerting means is cooperative between the carrier and a wall of the compartment to move the carrier. This means is reversible to return the seal and carrier to normal position after the exterior seal has been satisfactorily replaced.

In a preferred embodiment of the invention, the reversible force-exerting means comprises a plurality of jack screws attached to the carrier and extending in parallel relation to the shaft outwardly through the wall through which the shaft extends. Screw means is provided between the wall and the jack screws for enabling the user to propel and repel the interior carrier and seal. The screw-threaded means are themselves sealed against fluid leakage.

Features and advantages in addition to the above will be seen from the ensuing description and accompanying drawings.

BRIEF DESCRIPTION OF THE DRAWINGS

FIG. 3 is a section as seen substantially along the line of 3—3 of FIG. 2.

DESCRIPTION OF THE PREFERRED EMBODIMENTS

Figure 1:
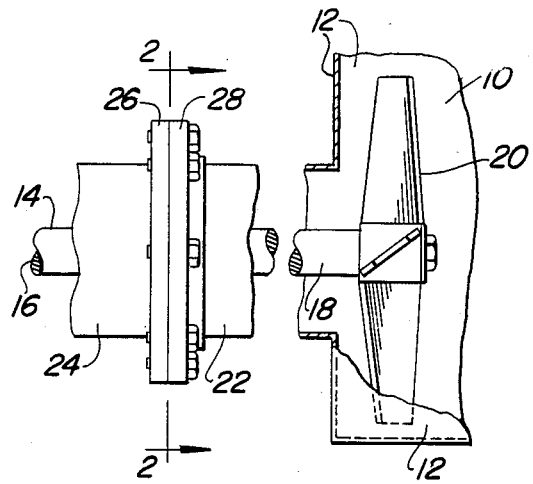
FIG. 1 is a small-scale elevation, with portions omitted, of a typical mixer installation in which the invention finds utility.
Figure 4:
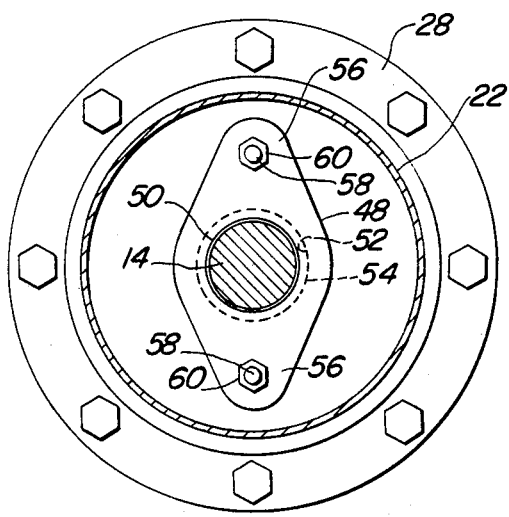
FIG. 4 is a section along the line 4—4 on FIG. 3.
Figure 2:
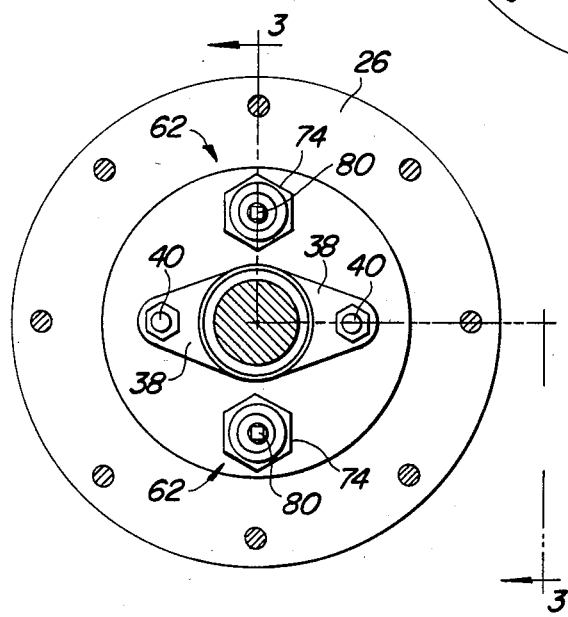
FIG. 2 is an enlarged elevation, with portions in section, as seen along the line 2—2 on FIG. 1.

Reference will be had first to FIG. 1 for a representative background structure, here comprising a tank or compartment (10) made up of a plurality of related walls, only a few of which appear at (12). This tank may be used for the mixing of fluids of any of several types, not significant to the present disclosure, at least in detail. A shaft (14) extends into the compartment and has an outer end portion (16) external to the compartment and an interior portion (18) within the compartment. The outer end portion of the shaft is typically connected to and driven by an electric motor (not shown), and the inner shaft portion has keyed thereto a multi-bladed mixer or paddle (20). The outer portion of the shaft further extends through a pair of coaxially connected housings (22) and (24). The latter is omitted from FIG. 3. The two housings may be connected in any suitable manner, as by complementary flanges denoted at (26) and (28). This detailed structure may be varied without sacrificing the utility of the invention, it being understood that the foregoing is merely environmental. The housing (22) does, however, in the instant situation, constitute part of the tank and the flange (26) comprises or represents a front wall of the tank.

The wall or flange (26) has a circular opening (30) which contains a packing sleeve (32). This sleeve has a tight fit with the wall opening, preferably augmented as by welding (not shown) to prevent leakage. The sleeve is of such diameter as to provide an annulus about the shaft for receiving any suitable seal or packing material (34) which is compressed axially between an inner or rear flange (35) on the sleeve and the inner end of a second sleeve (36) that fits telescopically into the sleeve (32). The sleeve (36) has a pair of diametrically opposed arms (38) through each of which is passed a threaded rod (40) fitted into a tapped bore (42) in the wall or flange (28). The bores are blind so as to require no fluid sealing between them and the rods (40). There are of course two such rods and in this case they are parallel to the shaft (14). A nut is threaded onto the outer end of each rod for moving the end sleeve (36) axially inwardly to compress the packing. Conversely, the nuts may be removed to enable removal and replacement of the packing. The whole of the structure just described constitutes an outer seal to prevent leakage of fluid from the tank during normal use.

From the description thus far, it will be seen that removal of the front or exterior seal, as by removal of the packing, will be accompanied by leakage of fluid from the tank around the shaft and through an annulus (46) formed by the inner periphery of the inner flange (35) of the sleeve (32). It is the purpose of the present invention to provide means for preventing this leakage during repair, replacement, etc., of the outer seal.

A carrier (48) is disposed within the compartment, having a central opening (50) that accommodates the shaft so that the carrier does not rotate with the shaft. The carrier further has a central, circular pocket or recess (52) which supports an interior seal (54), the retention of the seal in the carrier being a matter of choice so that the seal also does not rotate with the shaft. This seal may be made of rubber or the like so as to be compressible axially as well as radially inwardly. The carrier has a pair of integral, diametrically opposed radial arms (56) to cooperate with force-exerting means operative to move the carrier axially along the shaft toward and away from the interior face of the wall. In this case, the force-exerting means comprises a pair of threaded members (58), each in the form of a jack screw suitably attached at its inner end to a carrier arm by a nut (60), the jack screw being shouldered at (62) at the side of the arm opposite to the nut.

Each jack screw (58) is cooperative with screw-threaded means carried by the wall (26), each such means being designated in its entirety by the numeral (64). The design of each such means is such as to provide internal threads for the respective jack screw (58) as well as a fluid-tight seal to prevent loss of fluid about the jack screw. To this end, each means (64) incorporates a sleeve (66) having a head (68) at its inner end and received in a bore (70) through the wall (26). The exterior portion of the sleeve is threaded at (72) to receive a nut (74) which is tightened to compress an inner seal (76) between the sleeve head and the inner face of the wall (26).

Each sleeve (64) is further provided with an axial tapped bore (78) for receiving the associated jack screw (58), each member being of such length as to project forwardly or exteriorly for ready access to its forward end, which is formed of square or like section (80) to receive a suitable tool, such as a wrench (not shown). It is to be understood that the housing (24) may be separated from the housing (22) to provide access to the ends (80) of the members (58). Each sleeve is further formed with an interior annular recess (82) for receiving a suitable seal or packing material (84) which is compressed by a packing nut (86) threaded into a tapped forward portion (88) of the sleeve recess (82).

In the use of the invention, as when the outer seal or packing is to be removed for replacement, etc., the jack screws (58) are turned sufficiently to draw the carrier (48) forwardly to compress the internal central seal (54) against the inner face of the wall and about the shaft (14). The increasing resistance to further turning of the jack screws will indicate that the seal is sufficiently compressed. Should slight leakage occur after removal of the outer seal, the jack screws may be reversed or turned in the opposite direction to cause the carrier and inner seal to move axially away from the wall, thus relieving this seal of its temporary duty, it being clear that permitting the seal to remain in sealing relation to the shaft during rotation of the shaft would shorten its life. Thus a relatively low-cost material can be used for the inner seal.

It will have been seen from the foregoing that a simple and inexpensive means has been provided for temporarily sealing a shaft opening from the inside of the tank while the external seal is being replaced, thus avoiding extended shutdown of the mixer while the tank is drained. Further features and advantages of the invention will readily occur to those versed in the art, as will many modifications of the preferred embodiment illustrated, all without departure from the spirit and scope of the invention.

We claim:

1. In a fluid mixer having a compartment including walls, one of which has a circular opening, a shaft extending rotatably through the opening and having inner and outer portions respectively within and exteriorly of the compartment, and an external seal cooperative between the shaft outer portion and the wall and sealing the opening against escape of fluid from the compartment, the improvement residing in interior seal means comprising an annular seal element fitting the shaft inner portion within the compartment and normally spaced axially inwardly from the wall, a carrier within the compartment and supporting the seal elements and movable axially of the shaft, and operating means connected to the carrier and extending exteriorly of the compartment for selectively moving the carrier and seal element toward and against the interior face of the wall for temporarily sealing the shaft and wall element interiorly of the compartment said means being reversible for moving the carrier and seal element axially away from the wall.

2. The improvement according to claim 1, in which the operating means includes a portion extending through a wall of the compartment, and further seal means is provided for sealing the relationship of said portion and said wall.

3. The improvement according to claim 1, in which the operating means includes an externally threaded rotatable member connected to the carrier and extending exteriorly of the compartment, and internally screw-threaded means in the wall and matching and receiving the member.

4. The improvement according to claim 3, in which the screw-threaded member is rotatable on an axis paralleling the shaft axis.

5. The improvement according to claim 3, in which a third seal means is provided between the threaded member and screw-threaded means.

6. The improvement according to claim 3, in which the carrier has a plurality of radial portions, there are a like plurality of similar screw-threaded members connected respectively to the radial portions, and there are a like plurality screw-threaded means in the wall and respectively matching and receiving the members.

7. The improvement according to claim 6, in which additional seal means are provided for respectively sealing the threaded members and their screw-threaded means.

8. The improvement according to claim 6, in which the screw-threaded members are parallel to the shaft axis.

* * * * *